United States Patent
Kang et al.

(10) Patent No.: US 9,350,579 B2
(45) Date of Patent: May 24, 2016

(54) METHOD AND APPARATUS FOR DETERMINING THRESHOLD FOR SYMBOL DETECTION

(71) Applicant: SAMSUNG ELECTRONICS CO., LTD., Suwon-si (KR)

(72) Inventors: Joon Seong Kang, Suwon-si (KR); Chang Soon Park, Chungju-si (KR); Young Jun Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/280,874

(22) Filed: May 19, 2014

(65) Prior Publication Data
US 2015/0043682 A1  Feb. 12, 2015

(30) Foreign Application Priority Data
Aug. 9, 2013 (KR) .......... 10-2013-0094551

(51) Int. Cl.
H04L 25/06 (2006.01)
H04L 27/06 (2006.01)
H04L 29/06 (2006.01)

(52) U.S. Cl.
CPC .............. *H04L 27/06* (2013.01); *H04L 69/22* (2013.01)

(58) Field of Classification Search
USPC ........................................................ 375/224
See application file for complete search history.

(56) References Cited

U.S. PATENT DOCUMENTS

| | | | |
|---|---|---|---|
| 5,815,536 A * | 9/1998 | Abe ............................... | 375/344 |
| 6,370,190 B1 * | 4/2002 | Young et al. .................. | 375/233 |
| 6,618,451 B1 * | 9/2003 | Gonikberg .................... | 375/341 |
| 7,139,337 B2 * | 11/2006 | Gonikberg .................... | 375/341 |
| 7,555,079 B2 * | 6/2009 | He ................................ | 375/349 |
| RE43,204 E * | 2/2012 | Laugeois et al. .............. | 375/365 |
| 8,363,550 B1 * | 1/2013 | Yuan et al. .................... | 370/235 |
| 2004/0037374 A1 * | 2/2004 | Gonikberg .................... | 375/341 |
| 2005/0053024 A1 * | 3/2005 | Friedrich ....................... | 370/313 |
| 2007/0195444 A1 | 8/2007 | Annampedu | |
| 2009/0310690 A1 | 12/2009 | Lee | |
| 2010/0020864 A1 | 1/2010 | Matsuo et al. | |
| 2010/0189196 A1 | 7/2010 | Wang et al. | |
| 2011/0044691 A1 | 2/2011 | Jung et al. | |
| 2012/0163502 A1 | 6/2012 | Park et al. | |

(Continued)

FOREIGN PATENT DOCUMENTS

| | | |
|---|---|---|
| JP | 2006-261826 A | 9/2006 |
| JP | 2007-306128 A | 11/2007 |
| JP | 2008-271484 A | 11/2008 |
| JP | 2009-017018 A | 1/2009 |

OTHER PUBLICATIONS

Choi, Pilsoon, et al. "An experimental coin-sized radio for extremely low-power WPAN (IEEE 802.15. 4) application at 2.4 GHz." Solid-State Circuits, IEEE Journal of 38.12 (2003): 2258-2268.

(Continued)

*Primary Examiner* — Santiago Garcia
(74) *Attorney, Agent, or Firm* — NSIP Law

(57) ABSTRACT

A method of determining a threshold for symbol detection, includes receiving a most previously input sample value and a result of detecting a most previous symbol, and determining the threshold for the symbol detection of a currently input sample value based on the most previously input sample value and the result of detecting the most previous symbol.

21 Claims, 7 Drawing Sheets

(56) References Cited

U.S. PATENT DOCUMENTS

| | | |
|---|---|---|
| 2012/0242528 A1 | 9/2012 | Sato |
| 2012/0306517 A1* | 12/2012 | Regier et al. ............. 324/750.01 |
| 2014/0173387 A1* | 6/2014 | Park et al. ..................... 714/792 |

OTHER PUBLICATIONS

Moncunill-Geniz, F. Xavier, et al. "A generic approach to the theory of superregenerative reception." Circuits and Systems I: Regular Papers, IEEE Transactions on 52.1 (2005): 54-70.

* cited by examiner

METHOD AND APPARATUS FOR DETERMINING THRESHOLD FOR SYMBOL DETECTION

CROSS-REFERENCE TO RELATED APPLICATION

This application claims the benefit under 35 USC 119(a) of Korean Patent Application No. 10-2013-0094551, filed on Aug. 9, 2013, in the Korean Intellectual Property Office, the entire disclosure of which is incorporated herein by reference for all purposes.

BACKGROUND

1. Field

The following description relates to a method and apparatus for determining a threshold for symbol detection.

2. Description of Related Art

Due to an increased need for miniaturizing a size of portable devices and longer use of portable devices, a significance of simplifying a circuit structure and reducing power consumption is increasing. Such a need is reflected in a communication system. Thus, an amplitude-based modulation and demodulation communication system having a simplified circuit structure and lower power consumption, when compared to a frequency/phase-based modulation and demodulation communication system, is being utilized.

For example, the amplitude-based modulation and demodulation communication system includes an amplitude-shift keying (ASK) and an on-off keying (OOK). The ASK may refer to a scheme of transferring information by substituting a symbol to a different amplitude level. The OOK may refer to a scheme of transferring information by substituting a symbol based on whether a signal is present. In a process of demodulating an amplitude-based signal, it is imperative to determine a threshold corresponding to a reference value used in a comparison when a symbol is detected from an amplitude of a received signal.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of determining a threshold for symbol detection, including receiving a most previously input sample value and a result of detecting a most previous symbol, and determining the threshold for the symbol detection of a currently input sample value based on the most previously input sample value and the result of detecting the most previous symbol.

The method may further include detecting a symbol of the currently input sample value based on the threshold.

The determining may include setting the most previously input sample value to be a representative value of the most previous symbol.

In response to the result of detecting the most previous symbol corresponding to a first symbol, the determining may include setting the most previously input sample value to be a representative value of the first symbol, and determining the threshold for the symbol detection based on the most previously input sample value and a representative value of a second symbol that is included in a header of a packet.

In response to the result of detecting the most previous symbol corresponding to a second symbol, the determining may include setting the most previously input sample value to be a representative value of the second symbol, and determining the threshold for the symbol detection based on the most previously input sample value and a representative value of a first symbol that is included in a header of a packet.

The header may include a balanced data pattern in which a signal corresponding to the first symbol and a signal corresponding to the second symbol are repeated in an alternating pattern to minimize a change in a direct current (DC) component.

The method may further include setting a representative value of each of symbols based on information included in a header of a packet.

The setting may include setting an average of a sample value with respect to a first symbol that is included in the header to be a representative value of the first symbol, and setting an average of a sample value with respect to a second symbol that is included in the header to be a representative value of the second symbol.

The method may further include detecting an initial symbol based on the average of the sample value with respect to the first symbol and the average of the sample value with respect to the second symbol.

The method may further include estimating at least one of a received signal strength indicator (RSSI) of a received signal, a signal-to-noise ratio (SNR) of the received signal, and a bit error rate (BER) of the received signal, based on information included in a header of a packet, and controlling whether the determining is based on the most previously input sample value and the result of detecting the most previous symbol, based on whether a result of the estimating corresponds to a predetermined value.

The determining may include correcting a change in a direct current (DC) component based on the most previously input sample value.

A non-transitory computer-readable storage medium may store a program including instructions to cause a computer to perform the method.

In another general aspect, there is provided an apparatus configured to determine a threshold for symbol detection, including a receiver configured to receive a most previously input sample value and a result of detecting a most previous symbol, and a threshold determiner configured to determine the threshold for the symbol detection of a currently input sample value based on the most previously input sample value and the result of detecting the most previous symbol.

The apparatus may further include a symbol detector configured to detect a symbol of the currently input sample value based on the threshold.

The threshold determiner may be configured to set the most previously input sample value to be a representative value of the most previous symbol.

In response to the result of detecting the most previous symbol corresponding to a first symbol, the threshold determiner may be configured to set the most previously input sample value to be a representative value of the first symbol, and determine the threshold for the symbol detection based on the most previously input sample value and a representative value of a second symbol that is included in a header of a packet.

In response to the result of detecting the most previous symbol corresponding to a second symbol, the threshold determiner may be configured to set the most previously input sample value to be a representative value of the second symbol, and determine the threshold for the symbol detection based on the most previously input sample value and a representative value of a first symbol that is included in a header of a packet.

The apparatus may further include a header analyzer configured to analyze information included in a header of a packet to set a representative value of each of symbols, set an average of a sample value with respect to a first symbol that is included in the header to be a representative value of the first symbol, and set an average of a sample value with respect to a second symbol that is included in the header to be a representative value of the second symbol.

The information included in the header may include a symbol in a balanced data pattern in which a signal corresponding to the first symbol and a signal corresponding to the second symbol are repeated in an alternating pattern to minimize a change in a direct current (DC) component.

The apparatus may further include a header analyzer configured to estimate at least one of a received signal strength indicator (RSSI) of a received signal, a signal-to-noise ratio (SNR) of the received signal, and a bit error rate (BER) of the received signal, based on information included in a header of a packet, and a controller configured to control whether the determination is based on the most previously input sample value and the result of detecting the most previous symbol, based on whether a result of the estimating corresponds to a preset value.

In still another general aspect, there is provided an amplitude-based modulation and demodulation communication apparatus including a processor configured to determine a threshold to be used to detect a current symbol $Y_i$ of a current sample value $X_i$ based on a most previous sample value and a most previous symbol $Y_{i-1}$ of the most previous sample value $X_{i-1}$.

The processor may be configured to determine the threshold further based on an average of a sample value with respect to at least one of a symbol of "1" and a symbol of "0", the average being included in a header of a packet.

The processor may be configured to determine threshold based on the most previous sample value $X_{i-1}$ and the average of the sample value with respect to the symbol of "1", in response to the most previous symbol $Y_{i-1}$ corresponding to the symbol of "0", and determine threshold based on the average of the sample value with respect to the symbol of "0" and the most previous sample value $X_{i-1}$, in response to the most previous symbol $Y_{i-1}$ corresponding to the symbol of "1".

Other features and aspects will be apparent from the following detailed description, the drawings, and the claims.

Figure 1:
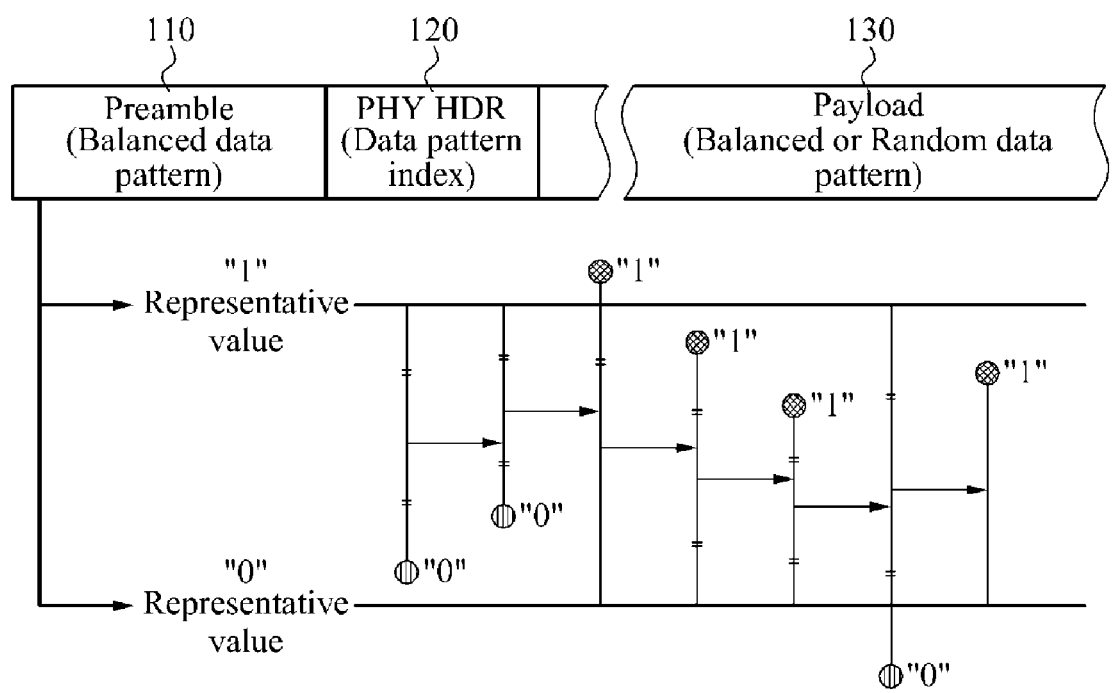
FIG. 1 is a diagram illustrating an example of applying a method of determining a threshold for symbol detection to an on-off keying (OOK) system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

As aforementioned, an on-off keying (OOK) system transfers information based on whether a signal is present. Thus, an amount of energy radiated by a transmitting end may be reduced, and power consumption may be also efficiently reduced. In an example, a method of determining a threshold for symbol detection will be described using the OOK system corresponding to an amplitude-based modulation system, as an example. Hereinafter, the OOK system will be explained in advance of the method of determining the threshold for the symbol detection.

In the OOK system, when an amplitude level of a received signal is greater than or equal to a detection threshold, a received symbol may be determined to be "ON" or a symbol of "1". When the amplitude level of the received signal is less than the detection threshold, the received symbol may be determined to be "OFF" or a symbol of "0".

The detection threshold refers to a reference value to be compared in the symbol detection. Setting the detection threshold may be a factor in determining a bit error rate (BER) of a receiving system.

A detection threshold minimizing the bit error rate is referred to as an optimum detection threshold. The optimum detection threshold may be determined based on a reception probability distribution of each symbol. For example, the optimum detection threshold may be determined based on an amplitude probability distribution of the symbol of "0" and an amplitude probability distribution of the symbol of "1".

When the amplitude-based modulation system is implemented using a low-power circuit, a characteristic of a change in a direct current (DC) component included in an amplitude modulation signal may be considered. The DC component may be a value obtained by averaging signals occurring in, for example, a predetermined time period, and/or a 0 hertz (Hz) frequency component of a signal spectrum.

The amplitude modulation signal may have a characteristic of the DC component varying based on a pattern of a symbol included in the amplitude modulation signal. For example, in the OOK system, a signal of which "ON" or the symbol of "1" continuously occurs may have a relatively high level of a DC component, and a signal of which "OFF" or the symbol of "0" continuously occurs may have a relatively low level of a DC component.

When a predetermined symbol pattern occurs, the DC component may vary based on time. For example, when the DC component is eliminated by a DC blocking capacitor, a waveform of a received signal may be distorted. Such distortion may lead to an error in the symbol detection, caused by a threshold set in advance.

FIG. 1 is a diagram illustrating an example of applying a method of determining a threshold for symbol detection to an OOK system. Referring to FIG. 1, a value having a most similar state to a DC component distortion of a currently input analog-to-digital converter (ADC) sample value $X_i$, may be a most previously input ADC sample value $X_{i-1}$. The most previously input ADC sample value may be applied to a process of setting a threshold $X_{TH}$ for the symbol detection to have a minimum BER.

In terms of reflecting an ADC sample value, whether the ADC sample value corresponds to a first symbol or a second symbol may need to be known in order to acknowledge a change in a DC component, and thus, a result of detecting a most previous symbol may be considered. The first symbol may be a symbol of "1" or an ON symbol, and the second symbol maybe a symbol of "1" or an OFF symbol, or vice versa. When the threshold for the symbol detection is determined, both the most previously input sample value and the result of detecting the most previous symbol may be reflected.

For example, an apparatus that determines the threshold for the symbol detection obtains a representative value of the symbol of "0" and a representative value of the symbol of "1", that is, a representative ADC sample value of each symbol, using a preamble 110 included in a packet. Hereinafter, the apparatus that determines the threshold for the symbol detection is referred to as a determination apparatus. The preamble 110 may also be referred to as a header.

When the threshold for the symbol detection of a physical high-availability data replication (PHY HDR) 120 and a payload 130 is determined, the determination apparatus sets the threshold, using a most previously input ADC sample value rather than using a representative value of a symbol corresponding to a result of detecting a most previous symbol. For example, when a most previously detected symbol corresponds to "0", the determination apparatus obtains a detection threshold, using the most previously input ADC sample value and the representative value of the symbol of "1". When the most previously detected symbol corresponds to "1", the determination apparatus obtains the detection threshold, using the most previously input ADC sample value and the representative value of the symbol of "0".

To enable the threshold for the symbol detection to obtain the minimum BER, a data pattern of the threshold for the symbol detection, or the preamble 110, is provided in a balanced pattern in which the symbol of "0" and the symbol of "1" are repeated in an alternating manner. A data pattern of the payload 130 is set in a random pattern or the balanced pattern in which the symbol of "0" and the symbol of "1" is repeated in an alternating manner. Also, information, for example, a data pattern index of the data pattern of the payload 130 is recorded in the PHY HDR 120, and the recorded information may be transmitted to a receiving end.

Figure 2:
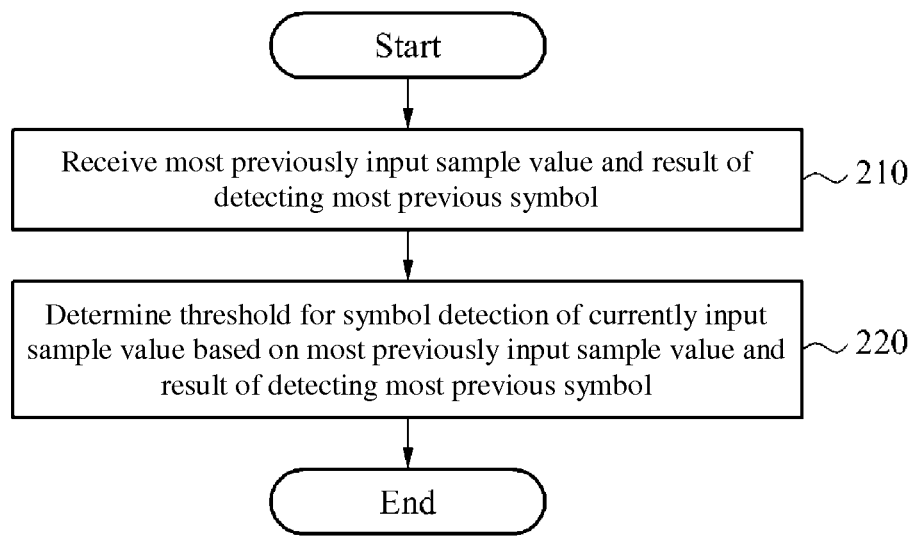
FIG. 2 is a flowchart illustrating an example of a method of determining a threshold for symbol detection.

FIG. 2 is a flowchart illustrating an example of a method of determining a threshold for symbol detection. Referring to FIG. 2, in operation 210, a determination apparatus receives a most previously input sample value and a result of detecting a most previous symbol. The most previously input sample value and the result of detecting the most previous symbol may be received through a packet as a fed back value.

For example, a currently input sample value may correspond to $X_i$, the most previously input sample value may correspond to $X_{i-1}$, a result of detecting a current symbol may correspond to $Y_i$, and the result of detecting the most previous symbol may correspond to $Y_{i-1}$. The determination apparatus may receive a packet in which the most previously input sample value and the result of detecting the most previous symbol $Y_{i-1}$ are recorded.

In operation 220, the determination apparatus determines the threshold for the symbol detection of the currently input sample value based on the most previously input sample value and the result of detecting the most previous symbol that are received. In an example, a symbol of the currently input sample value may be detected by determining the threshold in real time for each time a received signal is input, for example, the currently input sample value.

Figure 3:
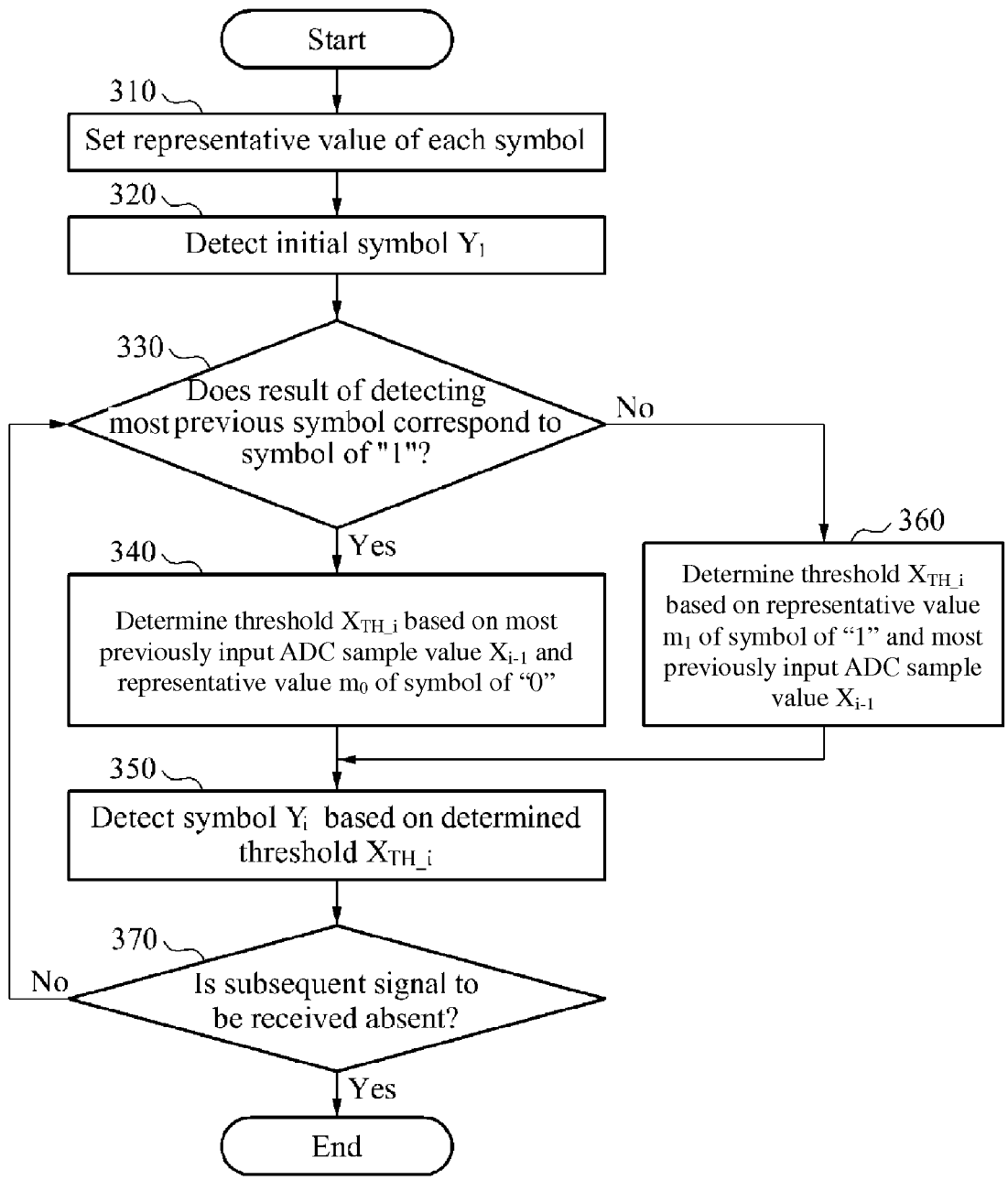
FIG. 3 is a flowchart illustrating another example of a method of determining a threshold for symbol detection.

FIG. 3 is a flowchart illustrating another example of a method of determining a threshold for symbol detection. Referring to FIG. 3, in operation 310, a determination apparatus sets a representative value of each symbol based on information included in a header of a packet. For example, the determination apparatus may set an average of an ADC sample value with respect to a first symbol that is included in the header of the packet to be a representative value $m_1$ of the first symbol. In addition, the determination apparatus may set an average of an ADC sample value with respect to a second symbol that is included in the header of the packet to be a representative value $m_0$ of the second symbol. The first symbol may correspond to a symbol of "1" or an ON symbol, and the second symbol may correspond to a symbol of "0" or an OFF symbol, or vice versa.

In operation 320, the determination apparatus detects an initial symbol $Y_1$ based on the representative value of each symbol, for example, the average of the ADC sample value with respect to the first symbol and the average of the ADC sample value with respect to the second symbol. As an example, when a result of detecting a most previous symbol is the symbol of "1", for example, $Y_{i-1}$="1", the determination apparatus may set a threshold $X_{TH\text{-}i}$ based on a most previously input ADC sample value $X_{i-1}$ and the representative value $m_0$ of the symbol of "0" that is included in the header of the packet. When the result of detecting the most previous symbol is the symbol "0", for example, $Y_{i-1}$="0", the determination apparatus may set the detection threshold $X_{TH\text{-}1}$ based on the most previously input ADC sample value $X_{i-1}$ and the representative value $m_1$ of the symbol of "1" that is included in the header.

In operation 330, the determination apparatus determines whether the result of detecting the most previous symbol corresponds to the symbol of "1". When the result of detecting the most previous symbol is determined to correspond to the symbol of "1", the determination apparatus continues in operation 340. Otherwise, the determination apparatus continues in operation 360. In detail, to acknowledge a change in an DC component, whether the ADC sample value corresponds to a value of the symbol of "0" or a value of the symbol of "1" may need to be known. Thus, the determination apparatus may reflect both the most previously input ADC sample value and the result of detecting the most previous symbol. To this end, the determination apparatus determines the result of detecting the most previous symbol, which may be the initial symbol $Y_1$, in operation 320.

In operation 340, the determination apparatus determines the threshold $X_{TH\_i}$ based on the most previously input ADC sample value and the representative value $m_0$ of the symbol of "0". The determination apparatus may set the most previously input ADC sample value $X_{i-1}$ to be a representative value of the most previously detected symbol, for example, the symbol of "1", to determine the threshold $X_{TH\_i}$ for the symbol detection. The representative value $m_0$ of the symbol of "0" may be included in the header of the packet.

In operation 360, the determination apparatus determines the threshold $X_{TH\_i}$ based on the representative value $m_1$ of the symbol of "1" and the most previously input ADC sample value $X_{i-1}$ The determination apparatus may set the most previously input ADC sample value $X_{i-1}$ to be a representative value of the most previously detected symbol, for example, the symbol of "0", to determine the threshold $X_{TH\_i}$ for the symbol detection. The representative value $m_1$ of the symbol of "1" may be included in the header of the packet.

As described above, a value having a most similar state to an DC component distortion of a currently input ADC sample value may be the most previously input ADC sample value. Thus, in an example, the most previously input ADC sample value may be set to be the representative value of the most previously detected symbol, and reflected in the method of determining the threshold $X_{TH}$ for the symbol detection, thereby setting an optimum threshold for a minimum BER.

The method of setting the optimum threshold may be described by Equation 1:

$$X_{TH\_i} = \begin{cases} 0.5 \times (m_0 + m_1) & \ldots \text{ the 1st Detection} \\ 0.5 \times (X_{i-1} + m_1) & \ldots Y_{i-1} = \text{Symbol '0'} \\ 0.5 \times (m_0 + X_{i-1}) & \ldots Y_{i-1} = \text{Symbol '1'} \end{cases} \quad \text{[Equation 1]}$$

In Equation 1, $X_{TH\_1}$ denotes the threshold for an $i_{th}$ symbol detection that is included in a payload unit of the packet, $X_{i-1}$ denotes an $i-1_{th}$ previously input ADC sample value included in the payload unit, and $Y_{i-1}$ denotes an $i-1_{th}$ previously detected symbol included in the payload unit.

In Equation 1, the representative value $m_0$ of the symbol of "0" and the representative value $m_1$ of the symbol of "1" may be described by Equation 2:

$$m_0 = \text{mean}\{H_k\}, k = \arg\{S_k = \text{Symbol '0'}\}$$

$$m_1 = \text{mean}\{H_l\}, l = \arg\{S_l = \text{Symbol '1'}\} \quad \text{[Equation 2]}$$

In Equation 2, $S_i$ denotes an $i_{th}$ transmitted symbol included in a header, and may have a value corresponding to the symbol of "0" or the symbol of "1". $H_i$ denotes an $i_{th}$ currently input ADC sample value included in the header, and may have a value between 0 and N. N indicates a maximum number of ADC samples.

In operation 350, the determination apparatus detects a symbol $Y_i$ of a currently input ADC sample value $X_i$ based on the threshold $X_{TH\_i}$ determined in operation 340 or 360. The symbol $Y_i$ of the currently input ADC sample value $X_i$ detected based on the threshold $X_{TH\_i}$ determined using Equation 1 may be expressed by Equation 3:

$$Y_i = \begin{cases} \text{Symbol '0' when } X_i \leq X_{TH\_i} \\ \text{Symbol '1' when } X_i > X_{TH\_i} \end{cases} \quad \text{[Equation 3]}$$

In Equation 3, $X_i$ denotes an $i_{th}$ currently input ADC sample value included in the payload unit of the packet, and may have a value between 0 and N. N indicates a maximum number of ADC samples. $Y_i$ denotes an $i_{th}$ currently detected symbol included in the payload unit of the packet.

In detail, the determination apparatus may detect the symbol $Y_i$ by comparing the currently input ADC sample value $X_i$ and the threshold $X_{TH}$. When the currently input ADC sample value $X_i$ is less than or equal to the threshold $X_{TH}$, for example, $X_i \leq X_{TH}$, the determination apparatus may determine the symbol $Y_i$ of the currently input ADC sample value $X_i$ to be "0". When the currently input ADC sample value $X_i$ is greater than the threshold $X_{TH}$, for example, $X_i > X_{TH}$, the determination apparatus may determine the symbol $Y_i$ of the ADC sample value $X_i$ to be "1", thereby detecting the symbol $Y_i$.

In operation 370, the determination apparatus determines whether a subsequent signal to be received, that is, a subsequently input ADC sample value, is absent. When the subsequent signal to be received is determined to be absent, the determination apparatus ends or terminates the method. When the subsequent signal to be received is determined to be present, the determination apparatus repeats operation 330, and detects the most previous symbol.

In the example of FIG. 3, the most previously input ADC sample value may be used to determine the threshold for the symbol detection in lieu of a value obtained through analyzing the header of the packet. That is, the most previously input ADC sample value is reflected in the method of determining the detection threshold to correct the change in the DC component.

Figure 4:
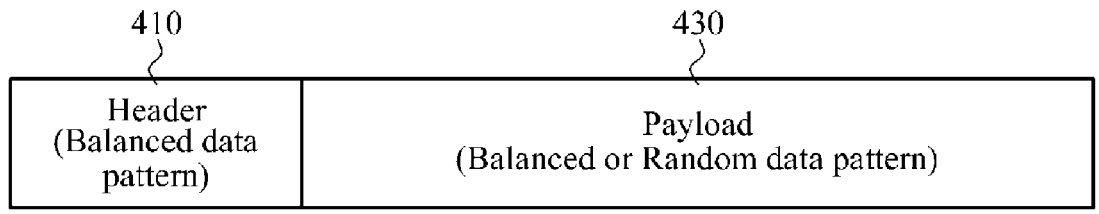
FIG. 4 is a diagram illustrating an example of a configuration of a packet for use in a method of determining a threshold for symbol detection.

FIG. 4 is a diagram illustrating an example of a configuration of a packet for use in a method of determining a threshold for symbol detection. A determination apparatus according to an example may set the detection threshold based on both a representative value of each symbol and a most previously input ADC sample value. Since the most previously input ADC sample value corrects a DC component varying in real time, a reception waveform in which the DC component is not changed may be used to set the representative value of each symbol.

Accordingly, in an example, a symbol included in a header 410 may be provided in a balanced data pattern in which a high-amplitude level signal and a low-amplitude level signal are repeated in an alternating manner to minimize a change in the DC component. The high-amplitude level signal and the low-amplitude level signal may be a signal corresponding to a first symbol and a signal corresponding to a second symbol, respectively. In an OOK system, for example, the header 410 may include symbol patterns described in Equation 4:

Balanced Pattern = [Equation 4]

{1 0 1 0 1 0 1 0 1 0 1 0 1 0}
{1 0 0 1 1 0 0 1 1 0 0 1 1 0 0 1}
{1 0 1 0 0 1 0 1 1 0 1 0 0 1 0 1}
{1 0 1 0 1 0 1 0 0 1 0 1 0 1 0 1}

The determination apparatus may determine the threshold based on the symbol provided in the balanced data pattern in which the signal corresponding to the first symbol and the signal corresponding to the second symbol are repeated in the alternating manner, and detect a symbol with respect to a sample value of a payload 430.

Figure 5:
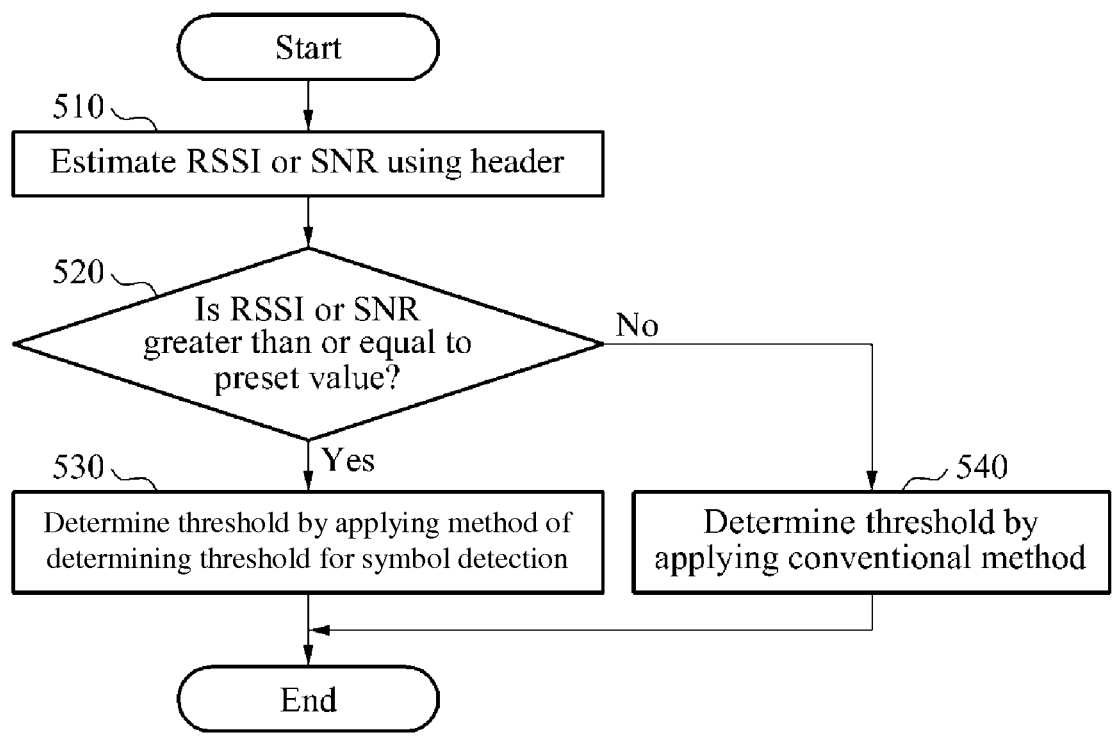
FIG. 5 is a flowchart illustrating an example of a method of determining whether a method of determining a threshold for symbol detection is to be applied.

FIG. 5 is a flowchart illustrating an example of a method of determining whether a method of determining a threshold for symbol detection is to be applied. When the detection threshold is set based on a result of detecting a most previous symbol, the result of detecting the most previous symbol may have an error due to a lack of a received signal strength indicator (RSSI) or a signal-to-noise ratio (SNR). When the result of detecting the most previous symbol has an error, the set detection threshold may be incorrect, and symbol error propagation indicating that an error detected in a previous symbol is applied to subsequent symbols may occur. Thus, an error rate of the symbol detection may significantly increase.

In operation 510, to prevent an error in the result of detecting the previous symbol, a determination apparatus according to an example estimates the RSSI, the SNR, and/or a BER based on information included in a header of a packet. The determination apparatus may estimate the RSSI, the SNR, and/or the BER by analyzing the information included in the header of the packet.

In operation 520, the determination apparatus determines whether the RSSI, the SNR, and/or a BER is greater than or equal to a preset value. When the RSSI, the SNR, and/or a BER is determined to be greater than or equal to the preset value, the determination apparatus continues in operation 530. Otherwise, the determination apparatus continues in operation 540.

In operation 530, the determination apparatus determines the threshold by applying the method of determining the threshold for the symbol detection according to the example.

In operation 540, the determination apparatus determines the threshold by applying a conventional method in lieu of the method of determining the threshold for the symbol detection according to the example.

Figure 6:
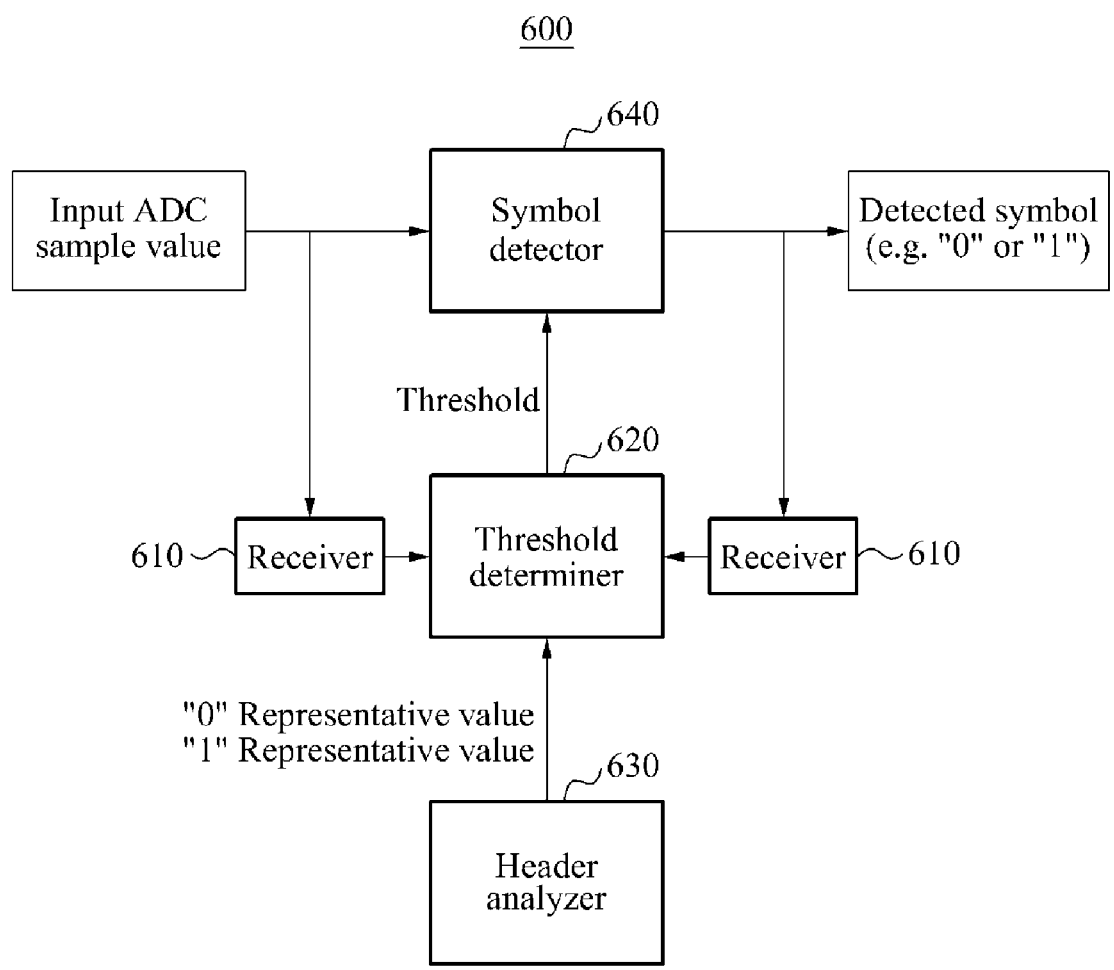
FIG. 6 is a block diagram illustrating an example of an apparatus that determines a threshold for symbol detection.

FIG. 6 is a block diagram illustrating an example of an apparatus 600 that determines a threshold for symbol detection. Referring to FIG. 6, the apparatus 600 that determines the threshold for the symbol detection according to the example includes a receiver 610, a threshold determiner 620, a header analyzer 630, and a symbol detector 640.

The receiver 610 receives a most previously input sample value and a result of detecting a most previous symbol. The receiver 610 may receive the most previously input sample value and the result of detecting the most previous symbol, through feedback. The receiver 610 further receives a currently received signal, for example, a currently input ADC sample value.

The threshold determiner 620 determines the threshold for the symbol detection of the currently received signal, for example, the currently input ADC sample value, based on the most previously input sample value and the result of detecting the most previous symbol. For example, an average of an ADC sample value for each symbol that is obtained by analyzing a header of a packet may be used to determine the threshold for the symbol detection. In another example, the result of detecting a most previous symbol $Y_{i-1}$ and a most previously input ADC sample value $X_{i-1}$ may also be used to determine the threshold for the symbol detection in lieu of an average of an ADC sample value of a corresponding symbol. Accordingly, the threshold may be adaptively determined with respect to a changing DC component. The result of detecting the most previous symbol and the most previously input ADC sample value may be stored in, for example, a register.

The header analyzer 630 analyzes information included in the header of the packet to set a representative value for each symbol. For example, the header analyzer 630 may obtain the average of the ADC sample value for each symbol, using the received header of the packet. The header analyzer 630 may set the average of the ADC sample value with respect to a first symbol (e.g., "1") that is included in the header of the packet to be the representative value of the first symbol, and set the average of the ADC sample value with respect to a second symbol (e.g., "0") that is included in the header of the packet to be the representative value of the second symbol.

The header of the packet may have a symbol pattern in agreement between a transmitting end and a receiving end. When a transmitted packet is set to be synchronized with the receiving end, the receiving end may recognize a received symbol. Thus, the apparatus 600 that determines the threshold for the symbol detection may select the ADC sample value for each symbol from the header of the packet, thereby obtaining the average of the ADC sample for each symbol.

The symbol detector 640 detects a symbol (e.g., "0" or "1") of the currently received signal, using the threshold determined by the threshold determiner 620. The symbol detector 640 may detect the symbol from the currently input ADC sample value by comparing the currently input ADC sample value to the threshold, as described in FIG. 3.

Figure 7:
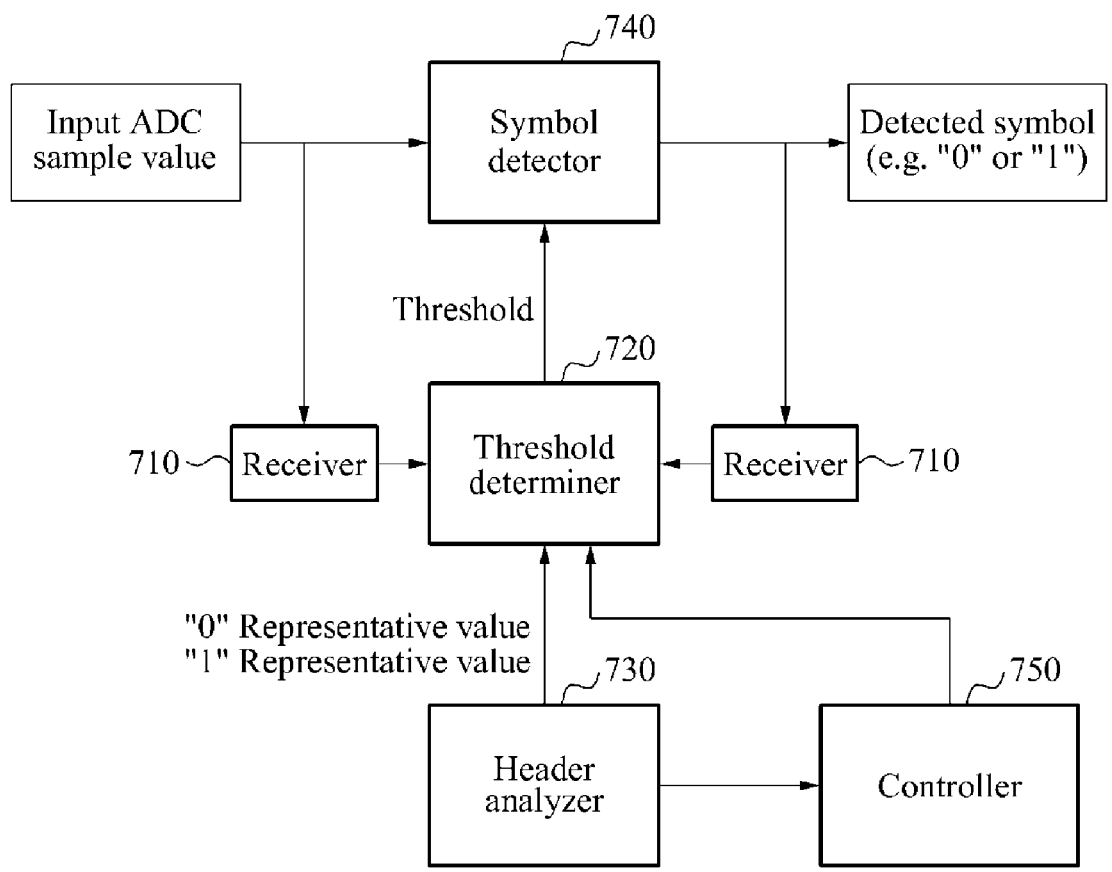
FIG. 7 is a block diagram illustrating another example of an apparatus that determines a threshold for symbol detection.

FIG. 7 is a block diagram illustrating another example of an apparatus 700 that determines a threshold for symbol detection. Referring to FIG. 7, the apparatus 700 that determines the threshold for the symbol detection according to the example includes a receiver 710, a threshold determiner 720, a header analyzer 730, a symbol detector 740, and a controller 750.

According to the example, a symbol may be adaptively detected based on a result of detecting a most previous symbol. Thus, when an error occurs in the symbol detection, the error may occur in subsequent symbol detection.

The header analyzer 730 analyzes information included in a header of a packet, and estimates at least one of an RSSI, an SNR, and a BER.

The controller 750 determines whether a method of determining the threshold for the symbol detection according to the example is operated in a normal manner based on the RSSI, the SNR, and/or the BER that are estimated by the header analyzer 730. Based on a result of this determining, the controller 750 controls whether the method of determining the threshold for the symbol detection according to the example is to be applied.

Descriptions of the operations of the receiver 610, the threshold determiner 620, the header analyzer 630, and the symbol detector 640 of FIG. 6 may be identically applied to operations of the receiver 710, the threshold determiner 720, the header analyzer 730, and the symbol detector 740, respectively, and thus, further descriptions will be omitted for increased clarity and conciseness.

The elements and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto.

A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A computer-implemented method of determining a threshold for symbol detection, the method comprising executing by a processor:

receiving, at a receiver, a most previously input sample value and a result of detecting a most previous symbol; and determining, at a determiner, the threshold for the symbol detection of a currently input sample value based on the most previously input sample value and the result of detecting the most previous symbol, wherein the most previously input sample value corresponds to a value most similar to a direct current (DC) component distortion of the currently input sample value and a value of a symbol included in a received header of a packet, and wherein the received header of the packet comprises a balanced data pattern for minimizing a change in the DC component.

2. The method of claim 1, further comprising:
detecting a symbol of the currently input sample value based on the threshold.

3. The method of claim 1, wherein in response to the result of detecting the most previous symbol corresponding to a first symbol, the determining comprises:
setting the most previously input sample value to be a representative value of the first symbol; and
determining the threshold for the symbol detection based on the most previously input sample value and a representative value of a second symbol that is included in the received header of the packet.

4. The method of claim 1, wherein in response to the result of detecting the most previous symbol corresponding to a second symbol, the determining comprises:
setting the most previously input sample value to be a representative value of the second symbol; and
determining the threshold for the symbol detection based on the most previously input sample value and a representative value of a first symbol that is included in the received header of the packet.

5. The method of claim 4, wherein the header comprises the balanced data pattern in which a signal corresponding to the first symbol and a signal corresponding to the second symbol are repeated in an alternating pattern to minimize a change in the direct current (DC) component.

6. The method of claim 1, further comprising:
setting a representative value of each of symbols based on information included in the received header of the packet.

7. The method of claim 6, wherein the setting comprises:
setting an average of a sample value with respect to a first symbol that is included in the received header to be a representative value of the first symbol; and
setting an average of a sample value with respect to a second symbol that is included in the received header to be a representative value of the second symbol.

8. The method of claim 7, further comprising:
detecting an initial symbol based on the average of the sample value with respect to the first symbol and the average of the sample value with respect to the second symbol.

9. The method of claim 1, further comprising:
estimating at least one of a received signal strength indicator (RSSI) of a received signal, a signal-to-noise ratio (SNR) of the received signal, and a bit error rate (BER) of the received signal, based on information included in the received header of the packet; and
controlling whether the determining is based on the most previously input sample value and the result of detecting the most previous symbol, based on whether a result of the estimating corresponds to a predetermined value.

10. The method of claim 1, wherein the determining comprises correcting a change in the direct current (DC) component based on the most previously input sample value.

11. A non-transitory computer-readable storage medium storing a program comprising instructions to cause a computer to perform the method of claim 1.

12. An apparatus configured to determine a threshold for symbol detection, the apparatus comprising:
a receiver implemented by a processor and configured to receive a most previously input sample value and a result of detecting a most previous symbol; and
a threshold determiner implemented by the processor and configured to determine the threshold for the symbol detection of a currently input sample value based on the most previously input sample value and the result of detecting the most previous symbol,
wherein the most previously input sample value corresponds to a value most similar to a direct current (DC) component distortion of the currently input sample value and a value of a symbol included in a received header of a packet, and
wherein the received header of the packet comprises a balanced data pattern for minimizing a change in the DC component.

13. The apparatus of claim 12, further comprising:
a symbol detector configured to detect a symbol of the currently input sample value based on the threshold.

14. The apparatus of claim 12, wherein in response to the result of detecting the most previous symbol corresponding to a first symbol, the threshold determiner is configured to:
set the most previously input sample value to be a representative value of the first symbol; and
determine the threshold for the symbol detection based on the most previously input sample value and a representative value of a second symbol that is included in the received header of the packet.

15. The apparatus of claim 12, wherein in response to the result of detecting the most previous symbol corresponding to a second symbol, the threshold determiner is configured to:
set the most previously input sample value to be a representative value of the second symbol; and
determine the threshold for the symbol detection based on the most previously input sample value and a representative value of a first symbol that is included in the received header of the packet.

16. The apparatus of claim 12, further comprising:
a header analyzer configured to:
analyze information included in the received header of a packet to set a representative value of each of symbols,
set an average of a sample value with respect to a first symbol that is included in the received header to be a representative value of the first symbol, and
set an average of a sample value with respect to a second symbol that is included in the received header to be a representative value of the second symbol.

17. The apparatus of claim 16, wherein the information included in the header comprises a symbol in the balanced data pattern in which a signal corresponding to the first symbol and a signal corresponding to the second symbol are repeated in an alternating pattern to minimize the change in the DC component.

18. The apparatus of claim 12, further comprising:
a header analyzer configured to estimate at least one of a received signal strength indicator (RSSI) of a received signal, a signal-to-noise ratio (SNR) of the received signal, and a bit error rate (BER) of the received signal, based on information included in the received header of the packet; and
a controller configured to control whether the determination is based on the most previously input sample value and the result of detecting the most previous symbol, based on whether a result of the estimating corresponds to a preset value.

19. An amplitude-based modulation and demodulation communication apparatus comprising:
  a receiver; and
  a processor configured to determine, based on receipt of information from the receiver, a threshold to be used to detect a current symbol $Y_i$ of a current sample value $X_i$ based on a most previous sample value $X_{i-1}$ and a most previous symbol $Y_{i-1}$ of the most previous sample value $X_{i-1}$,
    wherein the most previous sample value $X_{x-1}$ corresponds to a value most similar to a direct current (DC) component distortion of the current sample value $X_i$ and the current symbol $Y_i$ included in a received header of a packet, and
    wherein the received header of the packet comprises a balanced data pattern for minimizing a change in the DC component.

20. The apparatus of claim 19, wherein the processor is configured to determine the threshold further based on an average of a sample value with respect to at least one of a symbol of "1" and a symbol of "0", the average being included in the received header of the packet.

21. The apparatus of claim 20, wherein the processor is configured to:
  determine threshold based on the most previous sample value $X_{i-1}$ and the average of the sample value with respect to the symbol of "1", in response to the most previous symbol $Y_{i-1}$ corresponding to the symbol of "0"; and
  determine threshold based on the average of the sample value with respect to the symbol of "0" and the most previous sample value $X_{i-1}$, in response to the most previous symbol $Y_{i-1}$ corresponding to the symbol of "1".

* * * * *